Inventor
Nestor Mambourg
By Frank Fraser
Attorney

May 24, 1932. N. MAMBOURG 1,860,045
FURNACE
Filed May 9, 1928 2 Sheets-Sheet 2

Inventor
Nestor Mambourg
By Frank Fraser
Attorney

Patented May 24, 1932

1,860,045

UNITED STATES PATENT OFFICE

NESTOR MAMBOURG, OF LANCASTER, OHIO, ASSIGNOR TO LIBBEY-OWENS-FORD GLASS COMPANY, OF TOLEDO, OHIO, A CORPORATION OF OHIO

FURNACE

Application filed May 9, 1928. Serial No. 276,367.

The present invention relates to furnaces.

An important object of the invention is to provide a furnace particularly well adapted for the melting and production of molten glass whereby a relatively highly luminous and radiant frame is obtained.

Another object of the invention is to provide a furnace of the aforesaid character wherein the fuel is substantially burned and consumed before it leaves the furnace.

A further object of the invention is to provide an improved furnace construction having heating means associated therewith adapted to be operated in a manner that the formation of coke is considerably less than that ordinarily formed in the present type of furnaces.

A still further object of the invention is to provide an improved glass furnace having regenerative type heating means associated therewith, the fuel used being supplied in a manner that it is sandwiched in between streams or stratums of air so that the fuel does not contact directly with the walls of said regenerators, the fuel and air then being mixed in a manner to properly crack the fuel and obtain combustion thereof before leaving the regenerators, the mixing and cracking of the fuel being such that carbon is formed whereby to produce a luminous and radiant flame, which flame is so controlled that the carbon is substantially completely burned up or dissipated before it enters the opposite port on its way to the stack.

Other objects and advantages of the invention will become more apparent during the course of the following description when taken in connection with the accompanying drawings.

Figure 1:
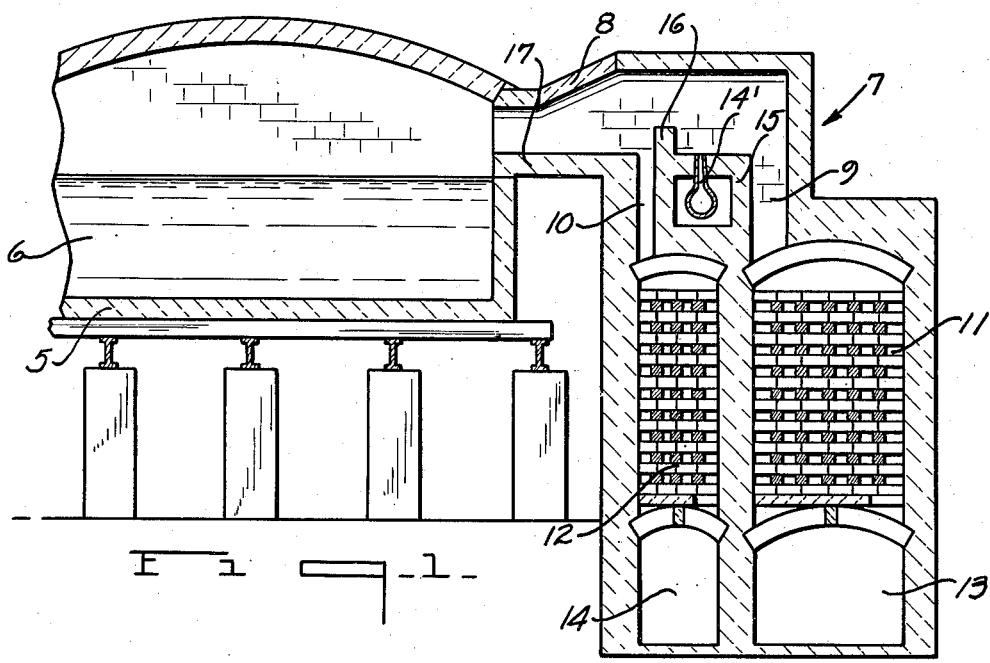
Figure 2:
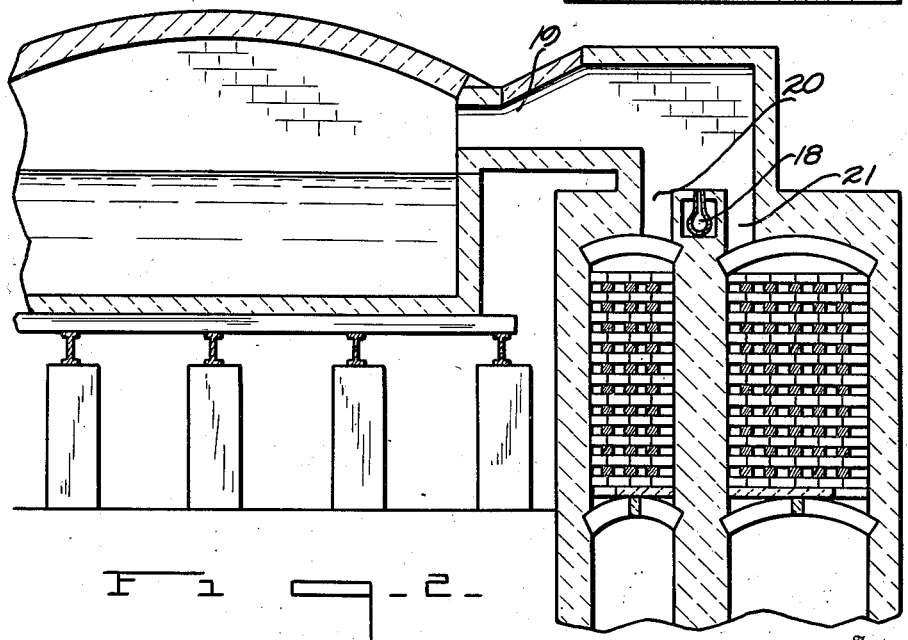
Figure 3:
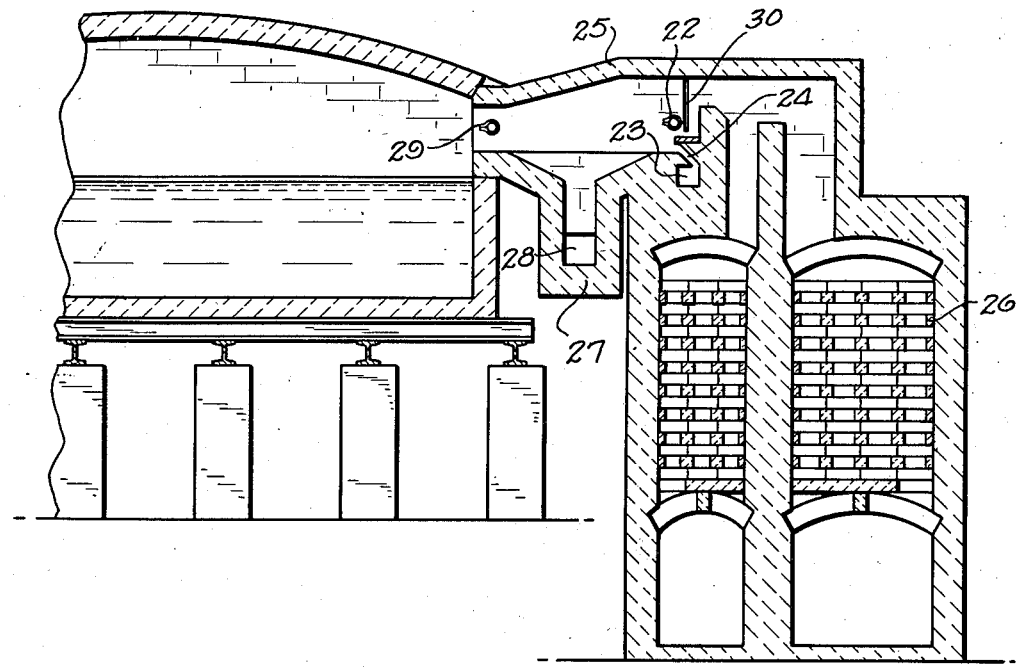

In the drawings wherein like numerals are employed to designate like parts throughout the same, Fig. 1 is a fragmentary vertical transverse section through a furnace illustrating one form of the invention, Fig. 2 is a similar section illustrating a modified construction, and Fig. 3 is still another type of furnace.

In glass melting furnaces and other combustion type furnaces it is generally expedient to employ a highly luminous and radiant flame. Likewise, it is considered desirable and advantageous to completely burn the fuel before it leaves the furnace. Hydrocarbons, such for instance as tar, fusel oil, gasoline, acetylene, and the like, which are rich in carbons, readily produce a flame of considerable luminosity. However, those hydrocarbons, such for instance as methane or ethane which contain considerable amount of hydrogen, produce a clear blue heat which can scarcely be called a flame. If light hydrocarbons of this character are to be burned to produce a flame, it is necessary to crack them, that is, by heating them in the absence of oxygen to break them up or decompose them into hydrogen, carbon and probably other combinations of hydrocarbons. The extent of the decomposition is a function of the hydrocarbon, and of the temperature to which it is heated, and the period of time during which it is maintained at a high temperature in the absence of oxygen. For instance, hydrocarbon containing a relatively small amount of carbon must be subjected to a higher temperature and maintained at that temperature for a longer period of time before there is any perceptible decomposition than hydrocarbon containing a relatively greater amount of carbon.

In accordance with the present invention, it is proposed to heat the hydrocarbon by the combustion of a small portion of the fuel in a port of the furnace. This desired effect is obtained by admitting gas to the port of the furnace at a preferably low velocity and permitting it to flow toward the furnace between layers or stratums of air also flowing at a preferably low velocity. Combustion occurs at the boundary between the two fluids and the gas line between the layers of air is heated and decomposed. The atoms of carbon thus formed by the cracking action coagulate and form flakes of soot. However, the arrangement and operation of the port is such that the soot is formed and used for its desired purpose, but in such a manner that the port is not coked.

The difficulty which has heretofore existed was not only that of burning the hydrogen quickly enough to produce a brilliant or luminous flame, but also to burn the flakes of soot before they leave the furnace.

Referring to the drawings, the numeral 5 in Fig. 1 designates a furnace. The furnace illustrated is a tank furnace and is adapted to contain a mass of molten glass 6. The molten glass is produced by suitably melting the glass batch ingredients as is well understood in the art. The heating means illustrated is of the regenerative type. The numeral 7 designates a single regenerator in section which is provided with a port 8 and two passages 9 and 10. Each passage communicates with a checker chamber 11 and 12 respectively, each checker chamber in turn communicating with a tunnel 13 and 14 respectively. Arranged between the passages 9 and 10 is a fuel supply means 14', and this may consist of a suitable pipe protected by refractory material 15. An upwardly extending portion 16 is illustrated in the construction shown in Fig. 1.

In the past it has been customary to produce a flame by flowing the fuel into a stream of air. The air would occupy the uppermost part of the port and the gas the lowermost part, the gas coming in direct contact with the lower wall such as the wall 17. With this arrangement the lower wall, corresponding to the wall 17 in the present case, being cold, a deposit of soot was made which resulted in a hard formation of coke. Although it is desirable to crack the fuel to produce carbon, it is desirous that the carbon particles remain in the flame during the heating of the glass or other material 6. In other words, although the carbon flakes are purposely produced, it is desirable that they be prevented from becoming deposited inside of the regenerator or port.

By arranging the fuel supply pipe between the two passages 9 and 10, a sandwich is in effect formed, the sandwich consisting of two outer layers or stratums of air and an inner layer or stratum of fuel. In this way the fuel does not contact directly with the walls of the regenerator due to the fact that the air completely surrounds the fuel. The air is preferably preheated by being passed through the checker works 11 and 12, the checker bricks obtaining their heat from the exhaust gases issuing from the regenerator opposed to the regenerator 7. It is well known in the art in the regenerative type of furnaces that the flames are alternately supplied from the opposite sides of the furnace, the reversal taking place at definite periods. In the operation of the present invention it is preferred that the lower stratum of air be relatively cooler than the upper stratum of air as it has been found that by having the lower stratum relatively cooler, although of course it is not cold, the tendency toward the formation of coke is less. However, I do not desire to limit myself in this respect, the invention referring broadly to the sandwiching of the fuel between the flows of air. The wall 16 is provided to make sure that a layer of air is interposed between the stratum of fuel and the wall 17.

The quantities of air and gas used to produce the flame can be varied. Theoretically, at least, the ideal ratio is an equal amount of fuel with an equal amount of air. In practice, however, it is customary to use an excess of gas, preferably approximately 9% excess gas. When the air and gas are fed in this manner it has been found that the gas or other fuel is properly cracked to produce flakes of soot, properly suspended in the flame so that a luminous and radiant flame is formed. The flame issues from the port 8 and passes transversely across the furnace 5 and then passes through the opposite port and down through a checker chamber similar to the chambers 11 and 12 which heats the blocks in the checker chamber. By properly controlling the pressure and amount of fuel and air, the luminous flame produced will consume or practically consume all of the carbon flakes so that the opposite port will not become coked. It is a difficult matter to properly melt molten glass, and a radiant flame is desirable because the heat will penetrate deeper into the mass of glass 6, which assists in properly melting and treating the glass.

Referring to Fig. 2, a slightly modified form of construction is shown wherein the fuel supply 18 is dropped below the level of the outlet port 19. In this case also, however, the fuel is sandwiched in between two layers of preferably preheated air supplied through the passages 20 and 21.

Referring to Fig. 3, it will be seen that the fuel is supplied through a pipe 22. Arranged preferably beneath the pipe 22 is an air passage or intake 23. The air flows from the chamber 23 through the opening 24 arranged on the bottom of the port 25. The air thus introduced will be interposed between the bottom of the port 25 and the flow of gas introduced through the pipe 22. As has been pointed out above, relatively cooler air is placed beneath the gas flow and the bottom of the regenerator port, and in Fig. 3 it is not necessary to preheat the air for this lower stratum. In this particular case the air may be blown by means of a fan or the like into the chamber 23. The air forming the upper stratum, however, is preferably preheated by means of the checker works 26.

When the flame is sweeping across the furnace from the opposite side, a certain amount of dust from the batch materials is blown into the port or regenerator. A sump 27 is provided to catch the slag, dust, etc. blowing into the port, the sump 27 being provided with a trap door or the like 28 so that it may be cleaned out at intervals.

Fig. 3 also differs from Figs. 1 and 2 in that a pipe 29 is provided in the port, and air or gas may be introduced through this pipe. Although air will work, it is preferred that gas be introduced and preferably under a relatively low pressure such as for instance from one-half to one and one-half pounds pressure. The introduction of air, gas, or other fuel in the pipe 29 causes a more thorough mixing of the fuel and air which gives greater combustion and better cracking of the fuel. Obviously, a pipe similar to the pipe 29 in Fig. 3 may be used in the constructions shown in Figs. 1 and 2, and further it is to be understood that the position of the pipes 29 may be varied as desired. The pipes 29 preferably extend inwardly through the side walls of the ports and at an angle.

The numeral 30 designates a slot formed in the side walls of the regenerator, provided to allow air to enter therethrough, which air substantially hugs the side wall, thus preventing the gas from contacting therewith. A similar slot is formed in both side walls of the regenerator so that the air entering through the slots in combination with the upper and lower stratums of air serves to completely surround the fuel with air. It is also to be understood that similar slots may be formed in the side walls of the regenerators shown in Figs. 1 and 2.

I have actually demonstrated the type of regenerator above described to be of considerable value, both from the standpoint of the type of flame produced and the absence of coke formation in the ports.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A regenerator of the character described, including a port, means for supplying a stream of air along the bottom thereof, means for supplying a stream of air along the top of said port, and means for supplying a stream of gaseous fuel between said streams of air, the stream of gaseous fuel contacting with said streams of air.

2. A regenerator of the character described, including a port, means for supplying a stream of air along the bottom thereof, means for supplying a stream of air along the top of said port, means for supplying a stream of gaseous fuel between said streams of air, the stream of gaseous fuel contacting with said streams of air, and means for preventing the gas from contacting with the sides of said port.

3. A regenerator of the character described, including a port, means for supplying a stream of air along the bottom thereof, means for supplying a stream of air along the top of said port, means for supplying a stream of gaseous fuel between said streams of air, and means for causing a flow of air along the sides of said port and between the gaseous fuel and said port sides, the stream of gaseous fuel contacting with all of said streams of air.

4. A regenerator of the character described, including a port, means for supplying a stream of air along the bottom thereof, means for supplying a stream of air along the top of said port, means for supplying a stream of gaseous fuel between said streams of air, and openings formed in the side walls of said port through which air passes.

5. A regenerator of the character described, including a port, means for supplying a stream of air along the bottom thereof, means for supplying a stream of air along the top of said port, means for supplying a stream of gaseous fuel between said streams of air, means for causing a flow of air along the sides of said port and between the gaseous fuel and said port sides, and a sump associated with the bottom of said port.

6. A regenerator of the character described, including a port, means for supplying a stream of air along the bottom thereof, means for supplying a stream of air along the top of said port, means for supplying a stream of gaseous fuel between said streams of air, and means for introducing a fluid within said port near the exit thereof.

7. A regenerator of the character described, including a port, means for supplying a stream of air along the bottom thereof, means for supplying a stream of air along the top of said port, and means for supplying a stream of gaseous fuel between said streams of air, the lower stream of air having a relatively lower temperature than that of the upper stream of air.

8. A regenerator of the character described, including a port, means for supplying a stream of air along the bottom thereof, means for supplying a stream of air along the top of said port, means for supplying a stream of gaseous fuel between said streams of air, the lower stream of air having a relatively lower temperature than that of the upper stream of air, and means for aiding the mixing of the various streams before they leave said port.

9. A regenerator of the character described, including a port, means for supplying a stream of air along the bottom thereof, means for supplying a stream of air along the top of said port, means for supplying a stream of gaseous fuel between said streams of air, the lower stream of air having a relatively lower temperature than that of the upper stream of air, and means for causing a flow of air along the sides of said port and between the gaseous fuel and said port sides.

Signed at Lancaster, in the county of Fairfield and State of Ohio, this 7th day of May, 1928.

NESTOR MAMBOURG.